United States Patent
Narayanan et al.

(10) Patent No.: US 10,678,445 B2
(45) Date of Patent: Jun. 9, 2020

(54) RECOVERY IN DATA CENTERS

(71) Applicant: Microsoft Technology Licensing, LLC, Redmond, WA (US)

(72) Inventors: Dushyanth Narayanan, Cambridge (GB); Aleksandar Dragojevic, Cambridge (GB); Miguel Oom Temudo de Castro, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 14/804,000

(22) Filed: Jul. 20, 2015

(65) Prior Publication Data

US 2016/0364158 A1 Dec. 15, 2016

Related U.S. Application Data

(60) Provisional application No. 62/173,670, filed on Jun. 10, 2015.

(51) Int. Cl.
*G06F 15/76* (2006.01)
*G06F 11/14* (2006.01)
(Continued)

(52) U.S. Cl.
CPC ............ *G06F 3/0619* (2013.01); *G06F 3/065* (2013.01); *G06F 3/067* (2013.01); *G06F 3/0631* (2013.01);
(Continued)

(58) Field of Classification Search
CPC ........ G06F 3/0631; G06F 3/065; G06F 3/067; G06F 11/1425; G06F 11/2025;
(Continued)

(56) References Cited

U.S. PATENT DOCUMENTS

| 6,014,669 A | 1/2000 | Slaughter et al. |
| 6,243,715 B1 * | 6/2001 | Bogantz ............... G06F 16/275 |
| | | 707/612 |

(Continued)

FOREIGN PATENT DOCUMENTS

| WO | 9917203 | 4/1999 |
| WO | 2010048048 | 4/2010 |
| WO | 2013072451 | 5/2013 |

OTHER PUBLICATIONS

Setrakyan, Dmitriy, "Two-Phase-Commit for Distributed In-Memory Caches", Published on: Sep. 3, 2014 Available at: http://gridgain.blogspot.in/2014/09/two-phase-commit-for-distributed-in.html.

(Continued)

*Primary Examiner* — Kevin T Bates
*Assistant Examiner* — Golam Mahmud
(74) *Attorney, Agent, or Firm* — Schwegman Lundberg & Woessner, P.A.

(57) ABSTRACT

A server at a cluster of servers in a data center is described. The server comprises a memory which is part of a distributed memory of the cluster. The server has at least one processor executing transactions and lock-free reads on software objects stored in regions of the distributed memory, the software objects and details of the transactions being replicated in the distributed memory. The server has a network interface card arranged to receive a message indicating a new configuration of the cluster comprising addition, removal or potential failure of at least one of the other servers. The processor is configured to use a recovery process which enables the lock-free reads and committed ones of the transactions to retain the properties of atomicity, consistency, isolation and durability across configuration changes.

20 Claims, 10 Drawing Sheets

(51) Int. Cl.
*G06F 11/20* (2006.01)
*G06F 12/16* (2006.01)
*G06F 9/02* (2006.01)
*G06F 3/06* (2006.01)
*H04L 29/08* (2006.01)
*H04L 12/24* (2006.01)
*G06F 11/00* (2006.01)

(52) U.S. Cl.
CPC ............ *G06F 3/0685* (2013.01); *G06F 11/00* (2013.01); *G06F 11/1425* (2013.01); *G06F 11/1474* (2013.01); *G06F 11/2025* (2013.01); *G06F 11/2097* (2013.01); *H04L 41/0813* (2013.01); *H04L 41/0893* (2013.01); *H04L 67/1097* (2013.01); *G06F 2201/82* (2013.01)

(58) Field of Classification Search
CPC ............. H04L 41/0813; H04L 41/0893; H04L 49/557; H04L 67/1097; H04L 69/40
USPC ........................................................ 709/221
See application file for complete search history.

(56) References Cited

U.S. PATENT DOCUMENTS

| | | | | |
|---|---|---|---|---|
| 6,247,023 | B1* | 6/2001 | Hsiao | G06F 11/1474 |
| 7,203,863 | B2 | 4/2007 | Pavlik et al. | |
| 8,676,851 | B1 | 3/2014 | Nesbit et al. | |
| 9,071,644 | B2* | 6/2015 | Auvenshine | H04L 63/20 |
| 9,417,974 | B2* | 8/2016 | Larson | G06F 11/1471 |
| 9,654,546 | B1* | 5/2017 | Narsude | G06F 11/1402 |
| 9,674,249 | B1* | 6/2017 | Kekre | H04L 65/60 |
| 2002/0184144 | A1* | 12/2002 | Byrd | G06Q 20/102 |
| | | | | 705/40 |
| 2004/0177099 | A1 | 9/2004 | Ganesh et al. | |
| 2006/0242644 | A1* | 10/2006 | Blue | G06F 9/526 |
| | | | | 718/100 |
| 2007/0219998 | A1* | 9/2007 | Lyle | G06F 16/2308 |
| 2007/0233900 | A1* | 10/2007 | Bartlett | G06F 16/275 |
| | | | | 709/245 |
| 2009/0217274 | A1 | 8/2009 | Corbin et al. | |
| 2010/0057740 | A1* | 3/2010 | Ni | G06F 9/466 |
| | | | | 707/E17.007 |
| 2010/0191884 | A1* | 7/2010 | Holenstein | G06F 11/2094 |
| | | | | 710/200 |
| 2011/0041006 | A1 | 2/2011 | Fowler | |
| 2012/0144098 | A1 | 6/2012 | Yang et al. | |
| 2013/0290655 | A1* | 10/2013 | Fang | G06F 16/2379 |
| | | | | 711/156 |
| 2014/0108484 | A1 | 4/2014 | Park et al. | |
| 2014/0207868 | A1* | 7/2014 | Gordon | G05B 19/4185 |
| | | | | 709/204 |
| 2015/0301900 | A1* | 10/2015 | Whitehead | G06F 11/14 |
| | | | | 709/219 |

OTHER PUBLICATIONS

Zamanian, et al., "Transaction Processing over High-speed Networks", In Research Proposal, Apr. 2015, pp. 1-7.
Narayanan, et al., "Whole-System Persistence", In Proceedings of Seventeenth International Conference on Architectural Support for Programming Languages and Operating Systems, Mar. 3, 2012, 10 pages.
"Consistency, Fault Tolerance, and Availability", Published on: Sep. 29, 2013 Available at: http://docs.clustrix.com/display/CLXDOC/Consistency,+Fault+Tolerance,+and+Availability.
"Consistency in Distributed Systems", Published on: Jan. 20, 2010 Available at: http://www.cl.cam.ac.uk/teaching/0910/ConcDistS/11a-cons-tx.pdf.
"Distributed Transactions Concepts", Published on: Feb. 11, 2012 Available at: http://docs.oracle.com/cd/B10501_01/server.920/a96521/ds_txns.htm.
"Database Internals", Jun. 4, 2015 Available at: https://courses.cs.washington.edu/courses/cse444/12sp/lectures/lecture21-2PC.pdf.
"Distributed Transactions Overview", Published on: Jan. 7, 2011 Available at: https://msdn.microsoft.com/en-us/library/ms681205(v=vs.85).aspx.
"Memcached", Jun. 4, 2015 Available at: http://memcached.org/.
"Apache Cassandra", Jun. 4, 2015 Available at: http://cassandra.apache.org/.
"MySQL", Jun. 4, 2015 Available at: http://www.mysql.com/.
"Neo4j", Jun. 4, 2015 Available at: http://neo4j.com/.
"Redis", Jun. 4, 2015 Available at: http://redis.io/.
Adya, et al., "Centrifuge: Integrated Lease Management and Partitioning for Cloud Services", In Proceedings of the 7th USENIX conference on Networked systems design and implementation, Apr. 28, 2010, pp. 1-16.
Aguilera, et al., "Sinfonia: A New Paradigm for Building Scalable Distributed Systems", In Proceedings of twenty-first ACM SIGOPS symposium on Operating systems principles, Oct. 14, 2007, 16 pages.
Chang, et al., "Bigtable: A Distributed Storage System for Structured Data", In Journal of ACM Transactions on Computer Systems (TOCS) TOCS Homepage archive, vol. 26, Issue 2, Jun. 2008, pp. 1-14.
Chockler, et al., "Group Communication Specications: A Comprehensive Study", In Journal of ACM Computing Surveys, vol. 33, Issue 4, Dec. 2001, 55 pages.
Corbett, et al., "Spanner: Google's Globally-Distributed Database", In Proceedings of 10th USENIX Symposium on Operating Systems Design, Oct. 8, 2012, pp. 1-14.
Decandia, et al., "Dynamo: Amazon's Highly Available Key-value Store", In Proceedings of twenty-first ACM SIGOPS symposium on Operating systems principles, Oct. 14, 2007, pp. 205-220.
Diaconu, et al., "Hekaton: SQL Server's Memory-Optimized OLTP Engine", In Proceedings of the ACM SIGMOD International Conference on Management of Data, Jun. 22, 2013, pp. 1-12.
Dice, et al., "Transactional locking II", In Proceedings of the 20th international conference on Distributed Computing, Sep. 18, 2006, 15 pages.
Dragojević, et al., "FaRM: Fast Remote Memory", In Proceedings of the 11th USENIX Conference on Networked Systems Design and Implementation, Apr. 2, 2014, pp. 401-414.
Graefe, Goetz, "Write-Optimized B-Trees", n Proceedings of the Thirtieth International Conference on Very Large Data Bases, vol. 10, Aug. 31, 2004, pp. 672-683.
Gray, et al., "Leases: An Efficient Fault-Tolerant Mechanism for Distributed File Cache Consistency", In Proceedings of ACM SIGOPS Operating Systems, vol. 23, Issue 5, Dec. 3, 1989, 9 pages.
Gray, et al., "Transaction Processing: Concepts and Techniques", Published on: Sep. 15, 1992, Available at: http://www.amazon.com/Transaction-Processing-Concepts-Techniques-Management/dp/1558601902.
Hunt, et al., "ZooKeeper: Wait-Free Coordination for Internet-Scale Systems", In Proceedings of the USENIX Annual Technical Conference, Jun. 23, 2010, 14 pages.
"InfiniBand Trade Association", Published on: Sep. 2, 2014, Available at: http://en.wikipedia.org/wiki/InfiniBand_Trade_Association.
Kalia, et al., "Using RDMA Efficiently for Key-Value Services", In Proceedings of the ACM Conference on SIGCOMM, Aug. 17, 2014, 15 pages.
Lamport, Leslie, "The Part-Time Parliament", In Journal of ACM Transactions on Computer Systems, vol. 16, Issue 2, May 1998, 33 pages.
Lamport, et al., "Vertical Paxos and Primary-Backup Replication", In Proceedings of the 28th ACM symposium on Principles of distributed computing, Feb. 9, 2009, pp. 312-313.
Larson, et al., "High-Performance Concurrency Control Mechanisms for Main-Memory Databases", In Proceedings of the VLDB Endowment, vol. 5, Issue 4, Aug. 27, 2012, 12 pages.
Lehman, et al., "Efficient Locking for Concurrent Operations on B-Trees", In Journal of ACM Transactions on Database Systems, vol. 6, Issue 4, Dec. 1981, 21 pages.

(56) References Cited

OTHER PUBLICATIONS

"Open CloudServer", Jun. 4, 2015 Available at: http://www.opencompute.org/wiki/Server/SpecsAndDesigns#Open_CloudServer.
"OCS Open CloudServer Power Supply", Jun. 4, 2015 Available at: http://www.opencompute.org/wiki/Server/SpecsAndDesigns#Open_CloudServer.
Mitchell, et al., "Using One-Sided RDMA Reads to Build a Fast, CPU-Efficient Key-Value Store", In Proceedings of the USENIX Annual Technical Conference, Jun. 26, 2013, 12 pages.
Neuvonen, et al., "Telecom Application Transaction Processing Benchmark", Jun. 4, 2015 Available at: http://tatpbenchmark.sourceforge.net/.
Ongaro, et al., "Fast Crash Recovery in RAMCloud", In Proceedings of the 23rd ACM Symposium on Operating Systems Principles, Oct. 23, 2011, 13 pages.
Rumble, et al., "Log-structured Memory for DRAM-based Storage", In Proceedings of the 12th USENIX Conference on File and Storage Technologies, Feb. 17, 2014, 17 pages.
Sethi, Ravi, "Useless Actions Make a Difference: Strict Serializability of Database Updates", In Journal of the ACM, vol. 29, Issue 2, Apr. 2, 1982, 10 pages.
Harris, Shaun, "Microsoft Reinvents Datacenter Power Backup with New Open Compute Project Specification", Published on: Mar. 10, 2015, Available at: http://blogs.technet.com/b/server-cloud/archive/2015/03/10/microsoft-reinvents-datacenter-power-backup-with-new-open-compute-project-specification.aspx.
Sowell, et al., "Minuet: A Scalable Distributed Multiversion BTree", In Proceedings of the VLDB Endowment, vol. 5, Issue 9, Aug. 27, 2012, 12 pages.
"Transaction Processing Performance Council", Jun. 2, 2015, Available at: http://www.tpc.org.
Tu, et al., "Speedy Transactions in Multicore In-Memory Databases", In Proceedings of 24th Symposium on Operating Systems Principles, Nov. 3, 2013 15 pages.
Zheng, et al., "Fast Databases with Fast Durability and Recovery through Multicore Parallelism", In Proceedings of 11th USENIX Symposium on Operating Systems Design and Implementation, Oct. 6, 2014, 14 pages.
Microsoft "Microsoft SQL Server 2012" Mar. 2012.
Narayanan, D et al. "FARM: Fast Available Remote Memory" Jun. 12, 2015 powerpoint presentation.
"International Preliminary Report On Patentability Issued in PCT Application No. PCT/US2016/035949", dated Mar. 2, 2017, 7 Pages.
International Search Report and Written Opinion from PCT/US2016/035949 dated Sep. 6, 2016, 12 pages.

* cited by examiner

RECOVERY IN DATA CENTERS

CROSS-REFERENCE TO RELATED APPLICATION(S)

This non-provisional utility application claims priority to U.S. provisional application Ser. No. 62/173,670 entitled "RECOVERY IN DATA CENTERS" and filed on Jun. 10, 2015, which is incorporated herein in its entirety by reference.

BACKGROUND

Data centers comprising large numbers of servers connected via a network are increasingly used for cloud computing services and are under high demand. As demand increases so do situations where one or more servers in the data center fail and this leads to outages of cloud computing services and other errors. Data center operators often need to add more servers to a data center in order to scale up to meet demand, or to remove servers for maintenance or upgrade.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A server at a cluster of servers in a data center is described. The server comprises a memory which is part of a distributed memory of the cluster. The server has at least one processor executing transactions and lock-free reads on software objects stored in regions of the distributed memory, the software objects and details of the transactions being replicated in the distributed memory. The processor can receive a message indicating a new configuration of the cluster comprising addition, removal or potential failure of at least one of the other servers. The processor is configured to use a recovery process which enables the lock-free reads and committed transactions to retain the properties of atomicity, consistency, isolation and durability across configurations.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

There is an increasing need for applications which run in data centers to provide cloud computing services which aim to be reliable. For example, the aim may be to provide database transactions which have atomicity, consistency, isolation and durability (known as ACID transactions). A transaction may be a single logical operation on a database, such as a distributed memory of a cluster of servers at a data center. For example, a transaction may be a transfer of data from one data record to another, perhaps involving multiple changes. In the examples described below a database may be a distributed memory logically defined over main memory of a plurality of servers of a data center.

Existing data center deployments typically do not provide ACID distributed transactions because previous attempts to do so have led to poor performance and/or poor availability. Data center designers have tended to avoid transactions completely, to weaken consistency guarantees, or to provide single-machine transactions that require programmers to partition their data.

In situations where failures in a data center occur, such as one or more servers crashing, it is extremely difficult to automatically recover from the failure situation in a way in which transactions in the data center remain ACID. This also applies where a data center seeks to recover from other configuration changes, such as addition of more servers or removal of one or more servers for maintenance or upgrade. A configuration change is any change in the data center infrastructure, such as a change in the arrangement of servers, or a change in the number of servers which are operational.

The embodiments described below are not limited to implementations which solve any or all of the disadvantages of known data center technology.

Figure 1:
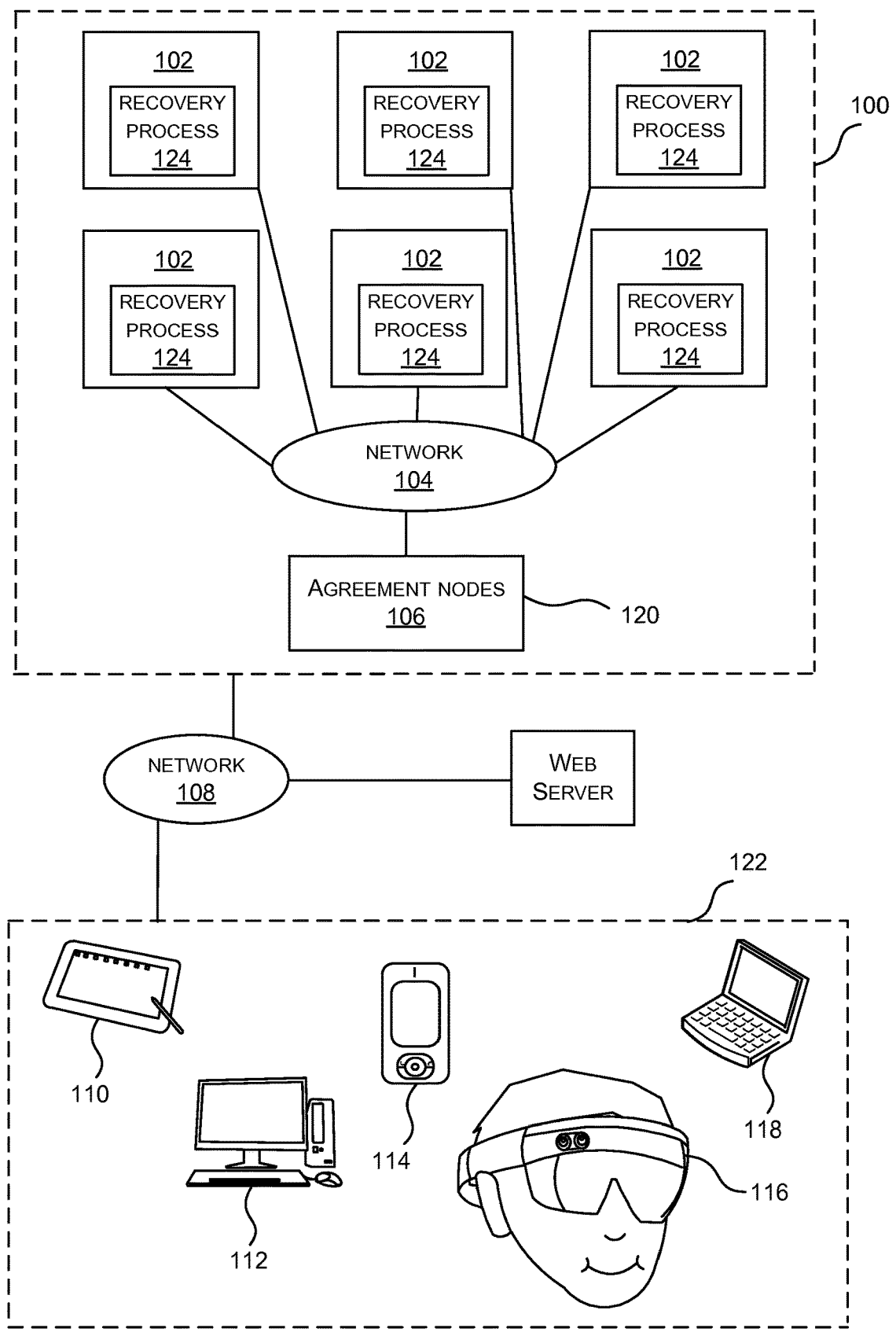
FIG. 1 is a schematic diagram of a data center with a cluster of servers having a new recovery process and showing the data center being used to provide cloud services to end user devices and web servers.

FIG. 1 is a schematic diagram of a data center 100 comprising a plurality of servers 102 connected via a network 104. The data center implements a new recovery process 124 which is stored at the servers 102 and which enables a cluster of servers at the data center to automatically recover from configuration changes, in a way which facilitates any committed transactions (including lock-free reads) implemented in the data center to be ACID despite the recovery. The new recovery process may also facilitate recovery such that any committed transactions implemented in the data center server cluster retain serializability, and in some cases, strict serializability. Serializability of a set of transactions is a well known term in the art. In summary serializability of a set of transactions means that externally observable effects of executing the transactions are the same as if the transactions were executed in some sequential ordering with no overlap in time, with each transaction executing instantaneously at a single point in time. Strict serializability means this point in time where a transaction appears to execute, is always between the start of transaction execution and the point when transaction completion is reported.

The recovery process works to facilitate any committed transactions (including lock-free reads) implemented in the data center to be ACID despite the recovery in a variety of ways. Some transactions whose commit phase spans configuration changes wait for the recovery protocol to decide if they commit or abort. These are transactions that are affected by the configuration change. Transactions that are not affected by the configuration change are able to execute a normal commit protocol whereas other transactions wait for the recovery process to decide their outcome.

Atomicity is the characteristic that a transaction is "all or nothing". That is, if one part of the transaction fails, the whole transaction fails and the database state is left unchanged. Consistency provides that a transaction brings the database from one valid state to another. Isolation provides that transactions do not interfere with one another. Durability provides that once a transaction has been committed, it will remain so. The recovery protocol acts to enable atomicity even in the case of recovery from power failures, crashes and other configuration changes. The recovery protocol achieves this at least in part by identifying transactions whose commit phase spans configuration changes and using the recovery protocol to decide if they commit or abort so as to achieve atomicity, consistency, isolation, and durability. In some examples, the recovery protocol provides the properties of ACID transactions at least in part by configuring servers in the data center such that replies to one-sided read requests received at the server are refused at least on the basis of a configuration identifier associated with the request. In some examples the recovery protocol provides the property of durability at least in part by using replication in the distributed memory of the data center and using transaction details. In some examples the recovery protocol provides the properties of ACID transactions at least in part by configuring servers in the data center to recover write locks of transactions already being committed at the time of the new configuration, the lock recovery process operating to recover the write locks from replicated transaction logs, which may have been written with one-sided writes.

A configuration change can result from failure of one or more servers, from addition or removal of servers for maintenance, or other reasons. A lock-free read is a round trip request, from a requesting server to a region at another server storing an object that returns the value of the object. It is performed with a single one-sided read, which means that the processor on the server that has the data is not involved in processing the request. A lock-free read gives the same outcome as a transaction that reads a single object and writes no objects.

The servers 102 of a cluster at the data center 100 execute one or more applications in order to provide cloud services to end user equipment 122, web servers 120 or other computing entities via a network 108 of any suitable type such as the interne or an intranet. The end user equipment can include tablet computers 110, personal desktop computers 112, smart phones 114, wearable computers 116, laptop computers 118, and others.

Six servers (also referred to as machines) 102 are shown in FIG. 1 although in practice many thousands of servers may be present. One or more agreement nodes 106 are provided to enable configurations of servers to be deployed as described in more detail below. Other components such as load balancers may be present in the data center 100 although these are not illustrated in FIG. 1 for clarity.

The data center 100 comprises a plurality of agreement nodes 106 which together provide an agreement service for agreeing new configurations of the servers 102 as described in more detail below. The agreement service uses data which is replicated over the plurality of agreement nodes 120 so that the agreement service is fault tolerant.

The servers of the cluster each have a local memory which together are treated as a distributed memory in the examples mentioned below. The memory may be divided into regions as described in more detail below, and the regions are replicated over the cluster of servers. Using replication in this way facilitates recovery because data from regions at a failed server can be recovered from replicas of those regions elsewhere in the cluster.

Figure 2:
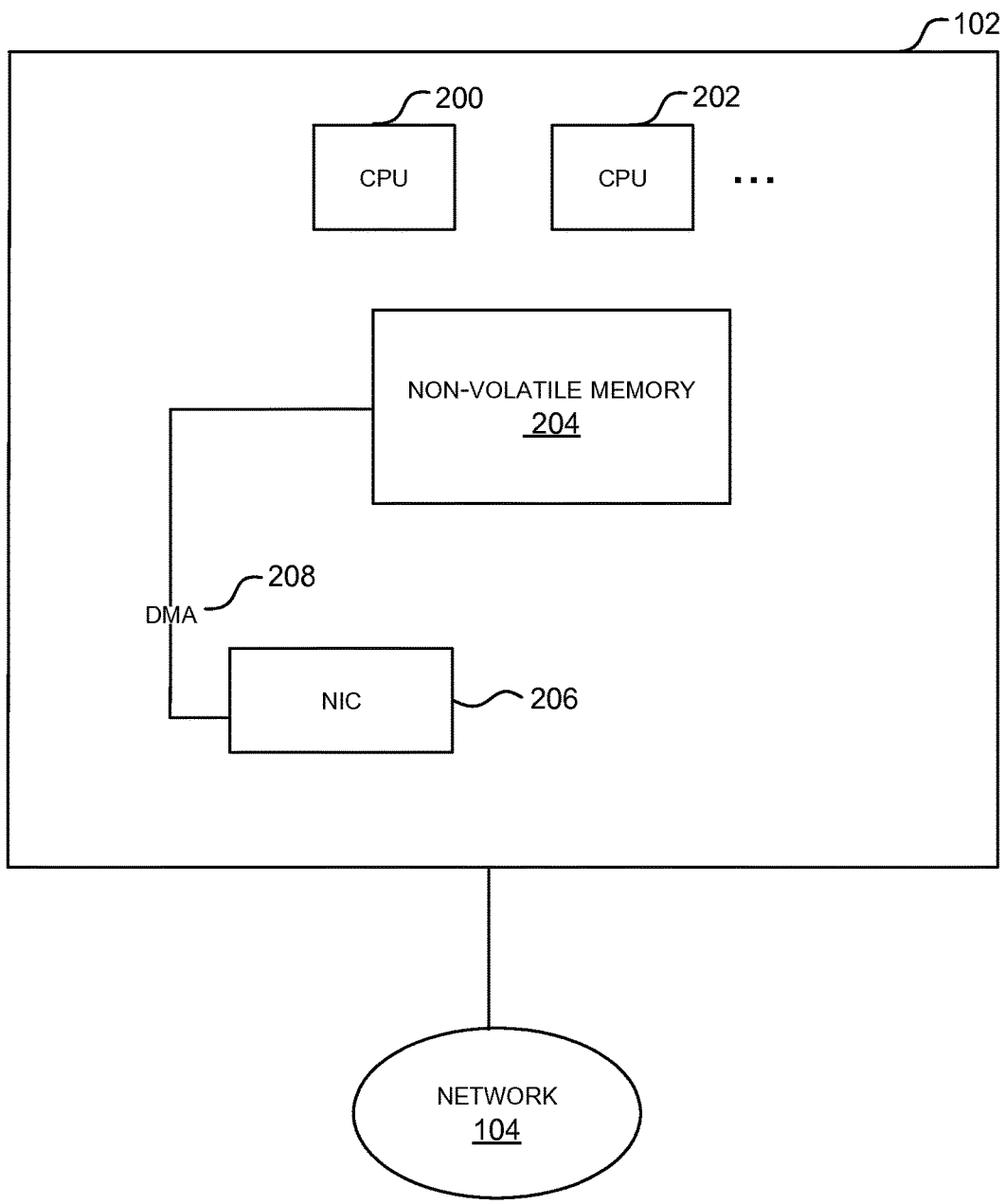
FIG. 2 is a schematic diagram of a data center server such as one of the servers of FIG. 1.

FIG. 2 is a schematic diagram of a data center server 120 such as one of the servers of FIG. 1. It comprises one or more central processing units 200, 202, a non-volatile memory 204 and a network interface card 206 or other means for communicating with other entities in the data center via network 104. The non-volatile memory 204 stores data in a manner such that it is retained in the event of the server crashing or losing power. When the server re-starts, data stored in the non-volatile memory 204 becomes available again. This can assist with making transactions implemented in the data center have the properties of ACID transactions even when all servers lose power. For example, the recovery process is able to use data from the non-volatile memory once it becomes available again, although that data may need updating.

In the examples described below, non-volatile memory is used, which may be implemented using dynamic random access memory (DRAM), a battery and a persistent store. However, it is not essential to use non-volatile memory. The data center server may use only volatile memory such as DRAM in some examples. This is because the replication of the distributed memory regions enables data to be recovered in situations where only volatile memory is used. By using non-volatile memory in combination with replication of the distributed memory regions, recovery is facilitated where there are multiple failures in a cluster of servers at the data center, for example, when all replicas for a software object crash at the same time.

It is possible for some of the servers of the data center to have only volatile memory and others of the data center servers to have non-volatile memory.

In some examples the non-volatile memory is implemented using local energy storage such as where batteries are used at each server together with a commodity solid state drive (SSD) or similar persistent storage. When a power failure occurs, the server saves the contents of non-persistent memory at the server (such as dynamic random access memory, DRAM) to the SSD using the energy from the battery. In this way, plentiful, cheap DRAM in data center servers can be used in a way which seeks to persistently store data and which thus facilitates making transactions have ACID properties.

In other examples non-volatile dual in-line memory modules (NVDIMMs) are used that contain their own private flash memory, controller and supercapacitor. Other types of nonvolatile memory may be used such as phase-change memory and memristors.

The network interface card 206 may be configured to enable one-sided operations which do not involve the CPU of the server 102. For example, the network interface card 206 may receive a one-sided read request from another of the data center servers over network 104. The network interface card reads the requested data from the non-volatile memory 204 using DMA 208 (direct memory access). The request from the remote server is referred to as a remote direct memory access (RDMA) because it is a request from the memory of one computer into another computer which involves the CPU of the computer initiating the RDMA request but not the CPU of the computer that responds to the RDMA request.

Using one sided operations in this manner gives the benefit of reducing load on the CPUs. Through empirical investigation the inventors have identified that use of one-sided RDMA reads and writes where possible to implement a transaction protocol in one or more clusters of servers at a data center gives improved performance. Having said that, it is not essential to use one-sided operations. Two-sided operations in which CPUs are involved may also be used.

Figure 3:
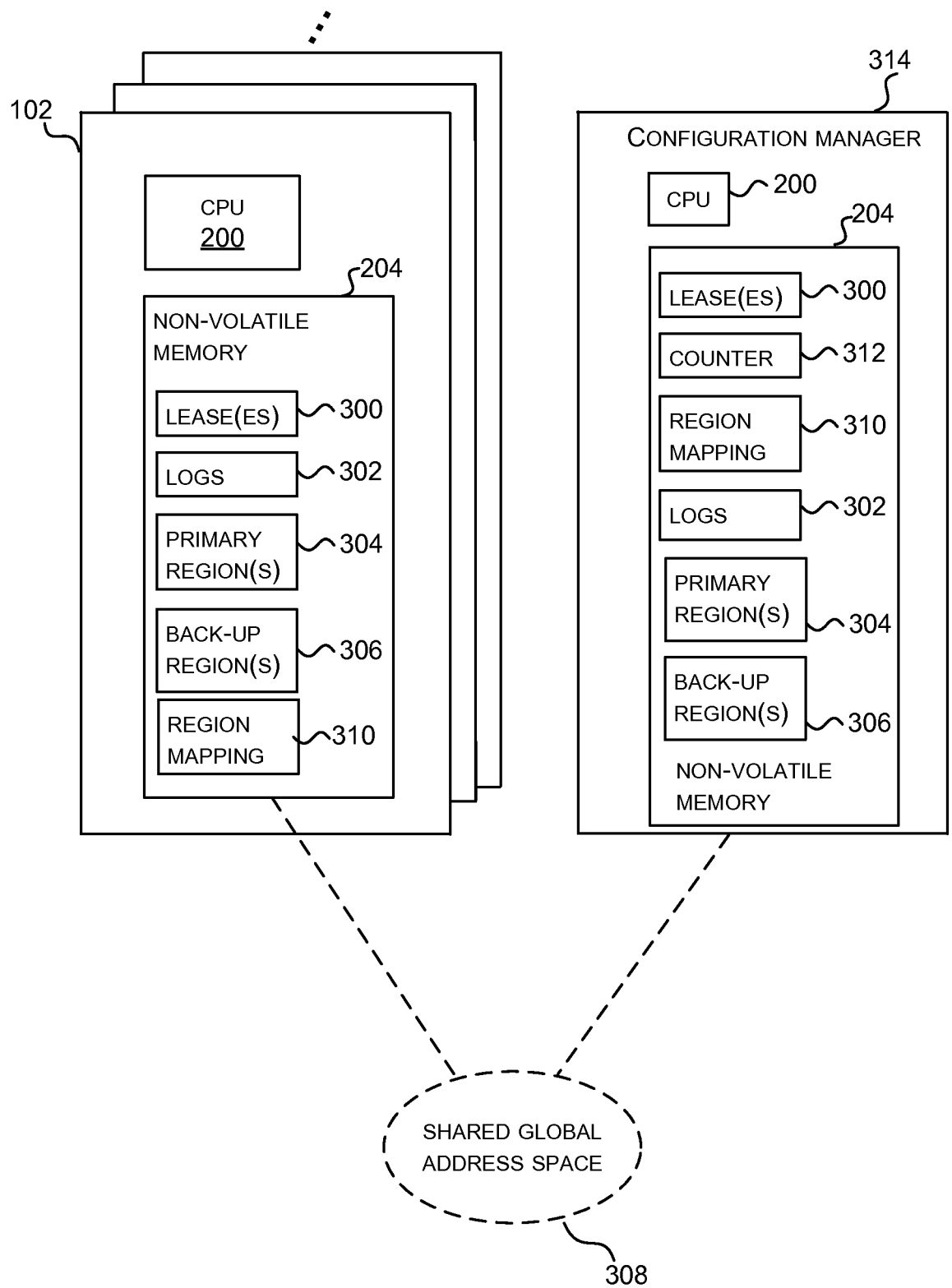
FIG. 3 is a schematic diagram of a configuration of servers and configuration manager at a data center server cluster.

FIG. 3 is a schematic diagram of a configuration of servers with a configuration manager at a data center. A configuration comprises a plurality of servers 102 at a data center and where one of the servers is a configuration manager 314. A configuration manager is arranged to allocate new regions of a distributed memory of the plurality of servers. It holds a region mapping 310 of the distributed memory. The distributed memory is illustrated with dotted lines in FIG. 3 as shared global address space 308 to indicate that it is not a shared physical memory but is a memory address space that refers to memory regions which are local at the servers 102. In the example in FIG. 3 memory regions 304, 306 at the local servers are in non-volatile memory 204 but they could be in volatile memory in some examples as mentioned above.

A memory region (of the distributed memory) can be a primary region 304 or a back-up region 306. A primary region is one which stores a primary copy of data and a back-up region is a replica of its counterpart primary region. Back-up regions are typically at different servers from the counterpart primary region. One or more back-up regions per primary region may be used. Regions store data such as software objects of the applications. In this way objects may be replicated in two or more machines.

The configuration manager uses a counter 312 to allocate new primary memory regions as described in more detail below.

A server 102 of the data center, including the configuration manager 314 which is a type of server 102, has one or more logs 302 which are stores such as buffers, ring buffers, or other stores held in non-volatile memory where the server has non-volatile memory available. The logs 302 store control data for use in implementing the recovery process. For example, version numbers, configuration identifiers, transaction identifiers and other data as described in more detail below.

The data center comprises a mechanism for automatically detecting configuration changes. In some examples this mechanism is a lease scheme used to detect potential server failures. In this case a server 102 stores a lease 300 and the configuration manager 314 stores lease information 300 for each server in the currently active configuration (there is a single active configuration at any point in time). Messages are sent between the configuration manager 314 and the servers of the configuration to request and renew leases. When a lease expires, a message from the corresponding machine has not been received for the lease period, and so the machine is suspected to have failed.

In some examples the data center comprises a mechanism for agreeing a new configuration, for example, if one or more servers fail or if one or more servers are added/removed. The agreement nodes 106 may manage this process. In some examples, the process of agreeing a new configuration uses a configuration protocol known to the servers and the agreement nodes. The configuration protocol may implement precise membership as explained in more detail below. By implementing precise membership the recovery process is able to work even where one-sided reads are involved. By using a configuration protocol which implements precise configuration membership, cluster recovery is facilitated even where one-sided operations are used during execution of applications at the cluster.

In some examples the network interface cards are configured to support leases with a timer, and to reject requests that arrive after the NIC's lease timer has expired without being renewed. In this case precise membership is not necessary and the recovery process is still able to work even where one-sided reads are involved.

The servers of the configuration, and the configuration manager 314 have knowledge of the recovery process as mentioned with respect to FIG. 1. The servers 102 and configuration manager 314 also know a transaction protocol and implement this transaction protocol in order to read and write data to and from the distributed memory. One or more applications execute on the servers to provide the cloud service(s). A thread of one of the applications executes a transaction to read and/or write data to the distributed memory and a transaction protocol is used to implement this process. The transaction protocol may be one which facilitates ACID properties of the transaction and which facilitates serializability of transactions and lock-free reads.

During operation of the data center multiple transactions execute on different threads and different servers and these transactions can be in any phase of execution when a configuration change occurs. This makes recovery from failures, or other configuration changes, extremely difficult.

The transaction protocol has an execution phase and a commit phase. An individual transaction is executed by a coordinator thread at one of the servers for the life of the transaction unless recovery from a configuration results in a new coordinator thread for the transaction. It is not necessary to have a single coordinator thread for the whole system. Multiple transactions may run in parallel, either in the execute phase or the commit phase. Different transactions may run in the same coordinator thread, or on a different coordinator thread on the same server, or on a different server. The transaction protocol may obtain a read set of the transaction, produce a tentative write set for the transaction, and commit the transaction once it is ready. A read set is a set of software objects read by the transaction and a write set is a set of software objects tentatively written by the transaction. In some examples the commit phase executes a two phase protocol with two round-trip RPCs (lock and validate) and one one-way RPC (update and unlock). "RPC" denotes a remote procedure call.

Figure 4:
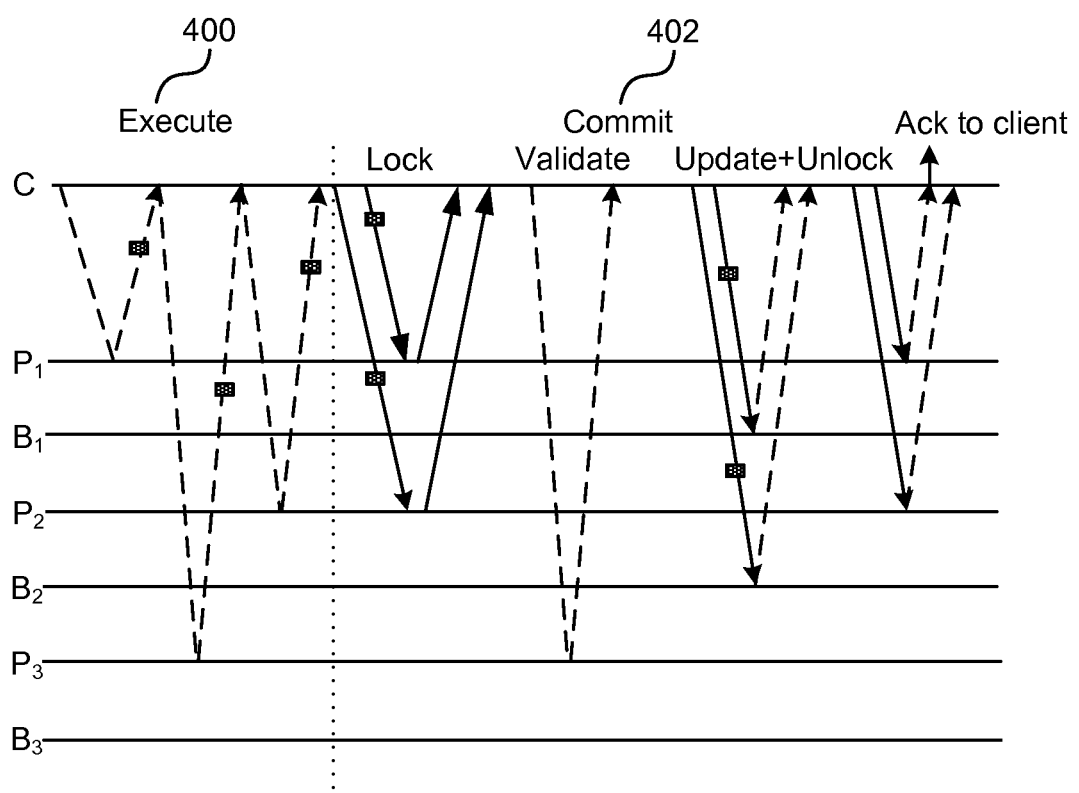
FIG. 4 is a schematic diagram of a transaction protocol.

In an example, the transaction protocol is designed for use with one-sided operations. An example of a suitable transaction protocol is given in FIG. 4 but this is one example only and others are possible. In the example of FIG. 4 the transaction is able to read objects using one-sided reads and, in the commit phase, to use one-sided writes. The transaction is able to use validation of read objects using one-sided reads to avoid locking read objects. The transaction protocol may add bits to data objects that enable the detection of concurrent reads. This mechanism enables serializability except in the presence of configuration change. By using the new recovery process, serializability is achieved even when configuration change occurs.

Transactions use optimistic concurrency control with version numbers in objects. They are executed by a coordinator, which is a thread on any of the servers that executes applications' transaction code. Coordinators are not replicated and communicate directly with primaries and backups, further reducing latency and message counts.

FIG. 4 shows a timeline for an example transaction protocol. During the execution phase, the coordinator issues reads for local or remote objects, and records their versions. It buffers writes until the transaction tries to commit Remote objects are read by issuing one-sided RDMA reads to object's primaries. During the commit phase it uses Pw(f+3) one-sided RDMA writes where Pw is the number of primaries with objects that are written by the transaction, and Pr onesided RDMA reads where Pr is the number of objects that are read but not written. It is also possible to validate the objects via remote procedure call to the primary, using two one-sided RDMA writes and CPU involvement at the primary. This is gives potential efficiencies in the case of primaries that are only read by the transaction and have a large number of objects read by the transaction.

The commit protocol uses RDMA writes into ring buffers that are stored in non-volatile DRAM at primaries and backups. Conceptually, each ring buffer is written only by the coordinator thread running the transaction and read asynchronously by the peer thread at the primary or backup (the implementation transparently multiplexes ring buffers across threads). Each ring buffer serves both as a message channel and as a transaction log. No other logs are required. When the transaction attempts to commit, the coordinator writes LOCK records to the logs at primaries of objects that were modified by the transaction. These records contain the object versions and the new state for written objects stored on the machine, and the list of all regions containing objects written by the transaction. The primaries use a compare-and-swap on the object version to atomically check if the object versions read by the coordinator are still current and lock the version if they are. They reply to the coordinator by writing an acknowledgement to a ring buffer at the coordinator that indicates whether the transaction should abort or continue.

Unlike a traditional two-phase commit protocol, readonly participants, which are primaries that store objects read by the transaction but do not store any modified objects, are not involved in this phase of the protocol. Instead, the protocol of FIG. 4 uses an additional read validation phase. The coordinator issues RDMAs to read the current versions of the objects read by the transaction (these are the Pr one-sided reads referred to above, one per object). If they match the versions originally read by the transaction, they are guaranteed to be current at the serialization point for the transaction, which is the point where all the locks are acquired. If they do not, the coordinator aborts the transaction. This is an important optimization because it ensures that transactions do not consume any CPU time at read-only participants and it eliminates both the need to block on read locks and the need to send messages to lock and unlock them. Latency does increase by two message delays because of it, but this is a good trade-off: RDMA reads take less than 3 microseconds in an unloaded system and the reduction in CPU time offsets the increased delay in a loaded system.

The overhead incurred due to replication is minimal. The coordinator issues a single RDMA write of a COMMIT-BACKUP record to the non-volatile logs at the backups and then waits for an acknowledgement from the NIC hardware without interrupting the backup's CPU. The COMMIT-BACKUP log record has the same content as LOCK records.

After receiving the acknowledgements (acks) from all backups, the coordinator writes a COMMIT-PRIMARY record to the non-volatile logs at the primaries. Primaries process COMMIT-PRIMARY records by updating the objects in place, incrementing their versions, and unlocking them, which exposes the writes committed by the transaction. Waiting for acks from the backups before sending COMMIT-PRIMARY is necessary to ensure strict serializability across failures. Otherwise, a primary and the coordinator could fail after some transaction reads the modifications, causing later transactions to miss the modifications.

If the coordinator is not a primary, it also waits for a hardware ack from at least one primary's NIC before acknowledging to the client. Otherwise the transaction may still abort if all the backups fail causing the system to lose information about the success of read validation.

Backups and primaries keep the records in their logs until they are truncated. The coordinator truncates logs at primaries and backups lazily after receiving acks from all primaries. It does this by piggybacking identifiers of truncated transactions in other protocol messages. The backups apply the updates to their copies of the objects at truncation time. In traditional two-phase commit protocols, participants reserve the resources to commit a transaction during the prepare phase and refuse to prepare the transaction if they do not have enough resources. A different technique is used in the method of FIG. 4 because backups' CPUs are not involved in the commit protocol. Instead, coordinators reserve space for all commit protocol records including truncate records in primary and backup logs before starting the commit protocol. The reservation is a local operation on the coordinator, as the coordinator is the owner of the log on the remote machine. The reservation is released when the corresponding record is written. Truncation record reservations are also released if the truncation is piggybacked on another message. If the log becomes full, the coordinator uses the reservations to send explicit truncate messages to free up space in the log. This happens rarely but is needed to ensure liveness.

Figure 5:
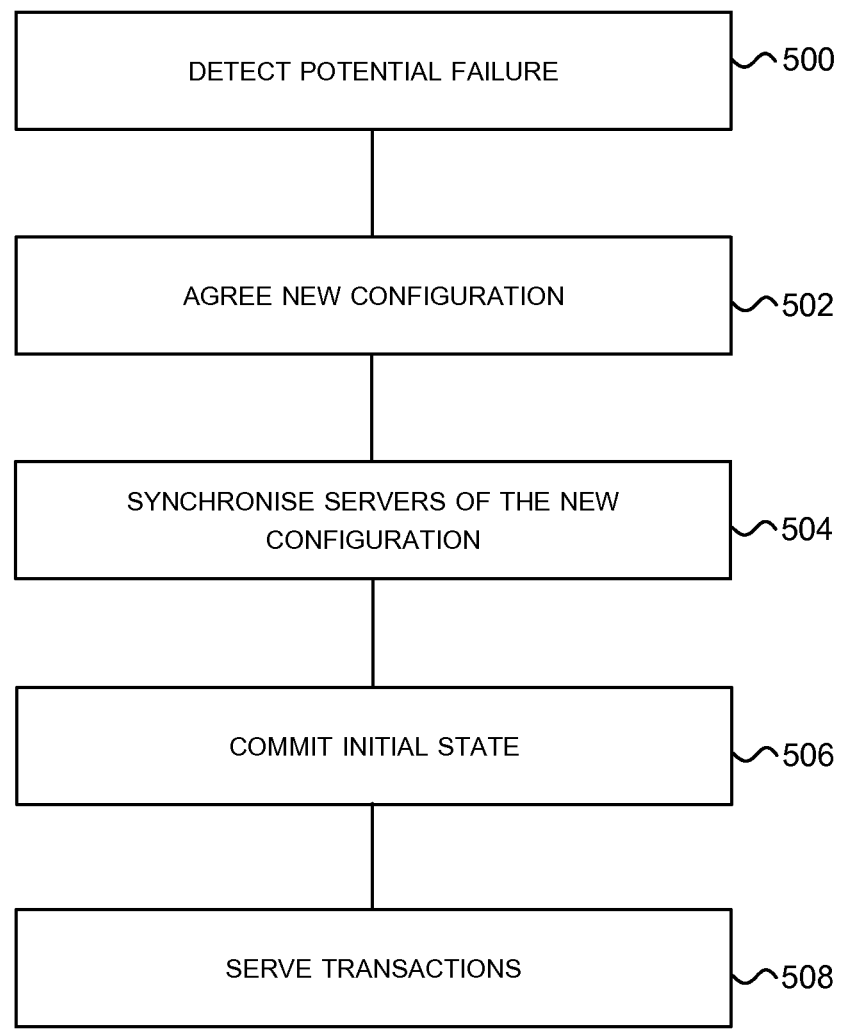
FIG. 5 is a flow diagram of a recovery process in a data center server cluster.

FIG. 5 is a flow diagram of a recovery process in a cluster of servers at data center. A potential failure, or other type of configuration change is automatically detected 500. For example, using the lease scheme as mentioned above or other methods to monitor behavior of the servers through peer to peer communications between the nodes. The results of the configuration change detection process are not always reliable since server failures cannot be detected reliably. Consequently, a server s that is falsely suspected to be faulty might keep serving read requests even when a majority of servers has declared s crashed. Once s is declared crashed the recovery process works to reassign its objects to other servers, in the interest of progress. If s has not really crashed, the recovery process works to prevent it from serving read requests with object values that are not consistent with the state of the system. More detail about how this is achieved is given below.

Figure 6:
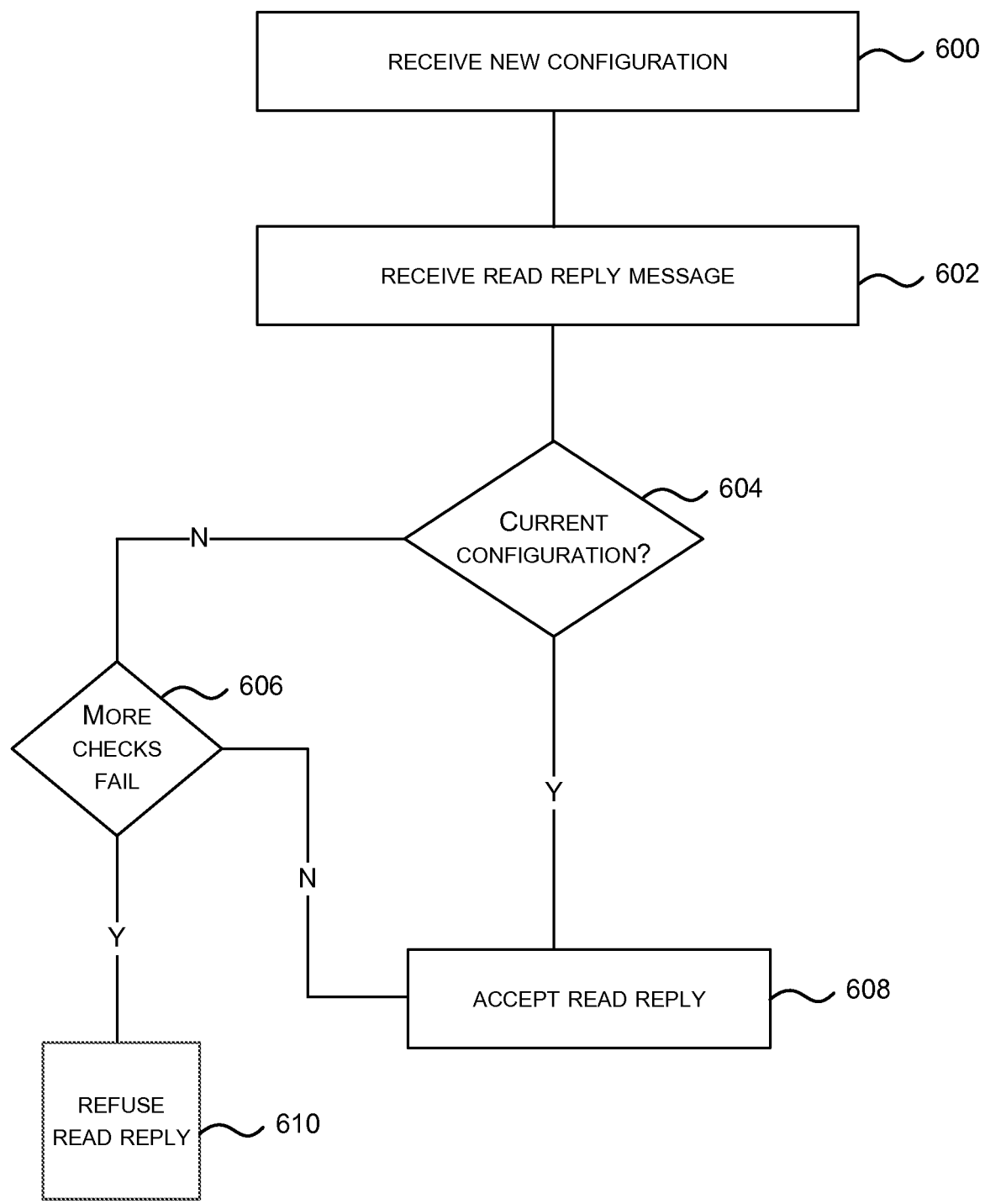
FIG. 6 is a flow diagram of a method at a server of a data center as part of a recovery process.

Once a potential configuration change has been detected a configuration protocol is invoked as mentioned above. This results in a new configuration being agreed 502. In some examples the configuration protocol implements precise membership. Precise membership means that all servers know which servers are in the configuration, and they also know that the other servers know that. In this case step 504 of FIG. 5 is carried out to synchronize the servers of the new configuration so they all know which servers are in the new configuration. This prevents a server which does not yet know about the new configuration from observing an inconsistent state by using one-sided requests. For example, it might access a piece of memory on another server sa that contained object o1 in previous configuration, but contains o2 in the new one. Because the processor on sa does not process the RDMA request, it cannot detect that the request is coming from an old configuration. If the server initiating the request does not know about the new configuration, it cannot reject the result either, so it ends up observing an inconsistent state. By making sure that all servers in the configuration are aware of it, a server can be arranged not to issue a lock-free read request to a server in a previous configuration and to reject replies from servers no longer in the configuration. This is now described in more detail with reference to FIG. 6.

A server in the data center cluster receives a new configuration 600, for example, it receives a message as part of the recovery process which comprises a list of identifiers of servers which are in the new configuration. The server receives 602 a lock-free read reply message (for example, at the network interface card 206). The lock-free read reply message comprises details of the ID of the sending server. The recovery process at one of the server's CPUs 200 checks 604 whether the ID of the sending server is present in the list of identifiers of servers which are in the new configuration. If so it accepts 608 the read reply. If not, the CPU makes more checks 606 in some examples. For example, it checks if the primary for the region being read changed since the read was issued. Under some circumstances the further checks 606 succeed and the CPU allows the read reply to be accepted 608. If the additional checks 606 fail the read reply is refused 610.

Returning to FIG. 5, the recovery process may use an alternative process at step 502 for agreeing the new configuration. For example, one-sided operations are not used. When a configuration change occurs this is detected using leases as mentioned above. The servers are not required to immediately agree a new configuration and are able to check if they hold the lease for the new configuration before replying to a read request.

The recovery process proceeds to commit initial state 506 of transactions (these are either transactions which have been forced to restart as a result of the new configuration, or transactions which have been allowed to continue despite the new configuration). This involves operating the recovery process so that participants of a configuration start a new configuration with consistent state and eventually all regions replicated. The data of the regions does not need to be replicated for transactions to proceed. The data recovery may happen after the transaction state is recovered, and may be done concurrently with resumed execution of the system as described in more detail below. During transaction recovery the information about the transaction log records affecting each region is replicated. During this stage servers acquire new regions and release old regions. Depending on the sequence of server crashes and data replication, it is possible that data is lost if not treated properly. More detail about the process of step 506 is given with reference to FIG. 7 below.

Once participants of a new configuration have consistent state, transactions are served 508 using the transaction protocol and lock-free reads may go ahead while region state is recovered.

Figure 7:
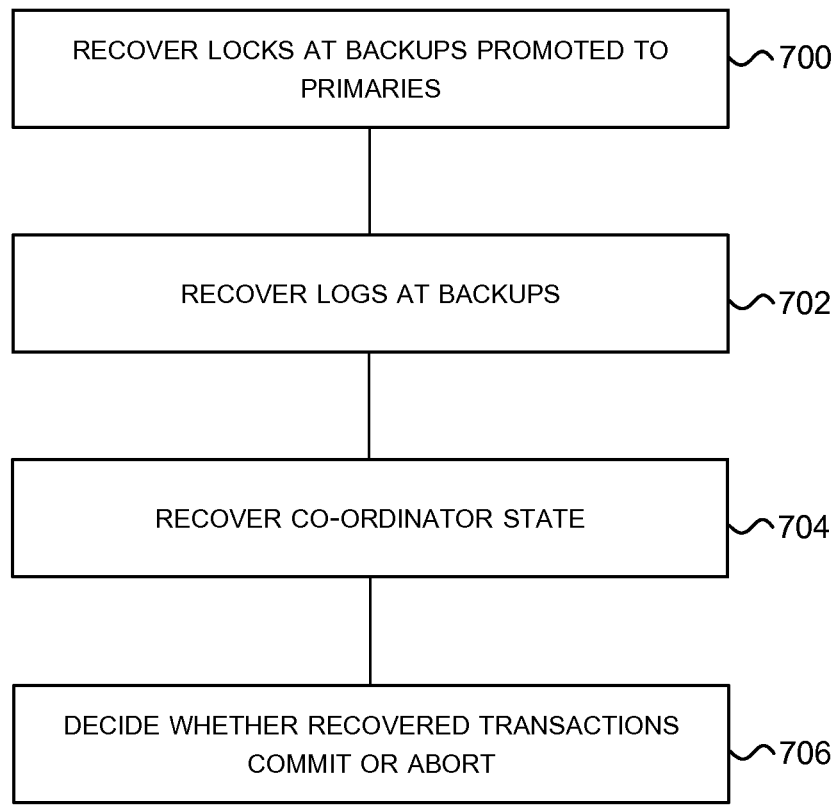
FIG. 7 is a flow diagram of a process of transaction state recovery in a data center.

FIG. 7 is a flow diagram of a process of transaction state recovery in a cluster of servers at a data center. This process comprises recovering 700 locks at backups which have been promoted to primaries, recovering logs 702 at backups, recovering co-ordinator state 704 and deciding 706 whether recovered transactions commit or abort. The process of FIG. 7 may operate in parallel with transactions that start in the new configuration.

Figure 8:
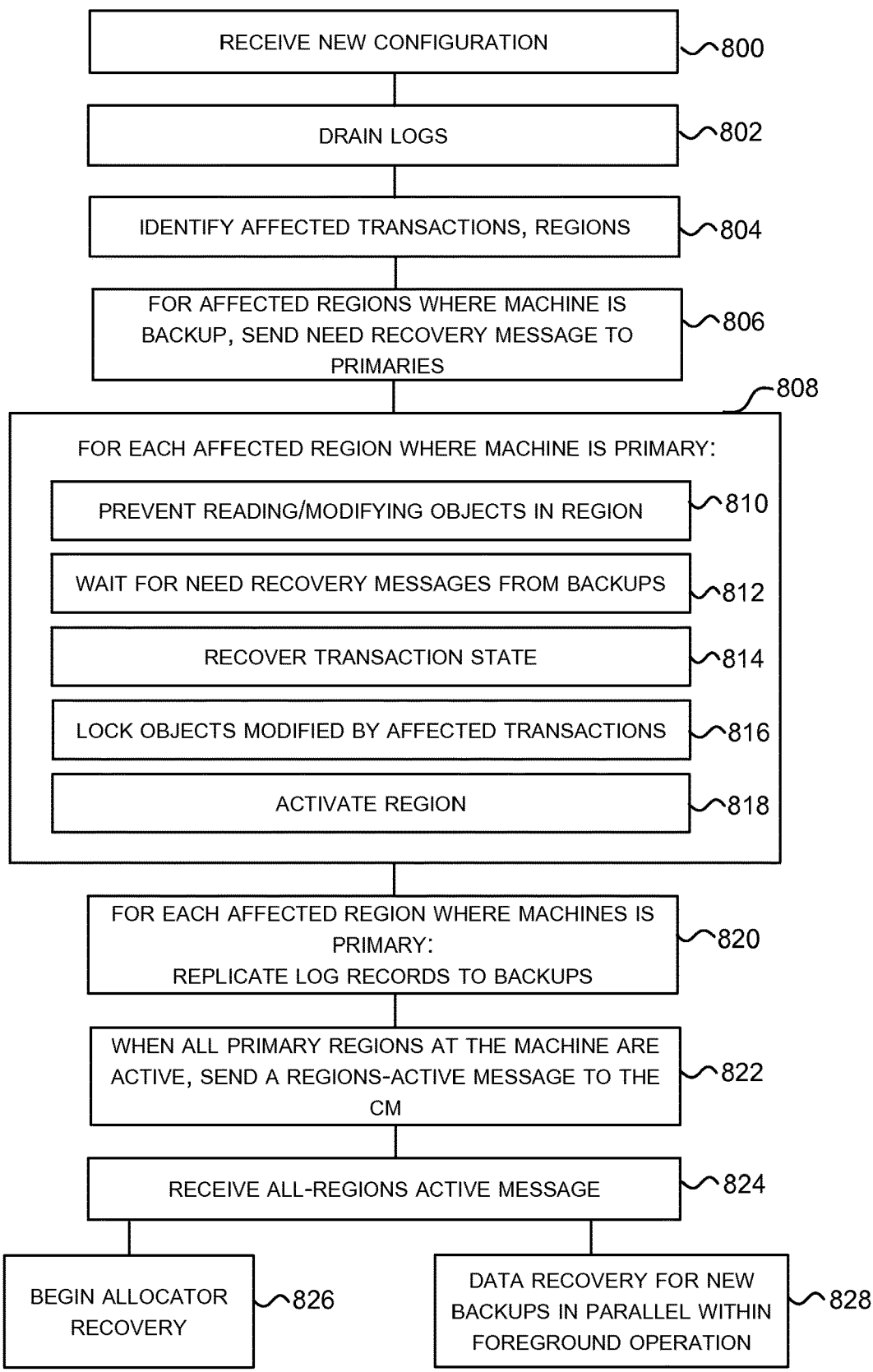
FIG. 8 is a flow diagram of a process at a server of a data center as part of a recovery process.

FIG. 8 is a flow diagram of a process at a server of a cluster at a data center as part of a recovery process. The flow diagram of FIG. 8 includes part of the process of steps 700 and 702 of FIG. 7 from the point of view of a single server of the data center cluster.

Servers attempt to write the new configuration to the agreement service at the agreement nodes 106. The one that wins becomes the CM and sends a NEW-CONFIG message to all the other servers in the configuration and conceptually to itself. The server receives a new configuration 800. When a machine receives a NEW-CONFIG with a configuration identifier i that is greater than its own, it updates its current configuration identifier and its cached copy of the region mappings, and allocates space to hold any new region replicas assigned to it. From this point, it does not issue new requests to machines that are not in the configuration and it rejects read responses and write acks from those machines. It also uses the process of FIG. 6 with respect to lock-free read requests.

The server replies to the CM with a NEW-CONFIG-ACK message (not shown in FIG. 8). Once the CM receives NEW-CONFIG-ACK messages from all machines in configuration i, it replies with a NEW-CONFIG-COMMIT message to all of them. This implements the precise membership process mentioned above.

Then the servers drain their logs 802, that is, they process all complete log records currently in the logs.

Messages are tagged with the current configuration and receivers reject any messages from previous configurations. This check is insufficient for one-sided RDMA writes into transaction logs because the coordinator acts on acks sent by the network hardware whereas primaries and backups process COMMIT-BACKUP and COMMIT-PRIMARY records asynchronously. To address this problem, transactions have unique identifiers <c, m, t, l> assigned at the start of commit that encode a thread-local unique ID l, the thread ID t of the coordinator, the machine ID m of the coordinator, and the configuration c in which the commit started. Primaries and backups cannot simply reject log records for transactions tagged with an old configuration because other primaries may already have committed the transactions and exposed their updates. Therefore, primaries and backups drain their logs by processing all log records when they receive a NEW-CONFIG-COMMIT message and they record the configuration identifier in a variable LastDrained when they are done. Draining the logs is shown in step 802 of FIG. 8. Correctness is ensured by rejecting log records for transactions with configuration identifiers less than or equal to LastDrained.

A log record is guaranteed to be processed before or during draining if the coordinator received the network hardware ack in the configuration when it started the commit protocol, and the coordinator rejects the ack if it is received in a later configuration.

Some transactions whose commit phase spans configuration changes wait for the recovery protocol to decide if they commit or abort. These are transactions that are affected by the configuration change, i.e., either their coordinator failed, the primaries for objects in their read set changed, or any replica for objects in their write set changed. Transactions that are not affected by the configuration change are able to execute the normal commit protocol whereas other transactions wait for the recovery protocol to decide their outcome. All machines agree on whether a transaction is allowed to execute without waiting for the recovery process. The CM guarantees agreement by reading the value of the LastDrained variable at each machine as part of the probe read, a one-sided read that machines attempting to become CM issue to each of the machines in the configuration. For each region r whose mapping has changed since LastDrained, the CM sends two configuration IDs in the NEW-CONFIG message to that machine. These are LastPrimaryChange[r], the last configuration ID when the primary of r changed, and LastReplicaChange[r], the last configuration ID when any replica of r changed. A transaction that started committing in configuration i−1 can proceed in configuration i if: for all regions r containing objects modified by the transaction LastReplicaChange[r]<i, and for all regions r0 containing objects read by the transaction LastPrimaryChange[r0]<i, and the coordinator has not been removed from configuration i. Coordinators use this information to decide whether to accept acks for RDMA writes to transaction logs and replicas use it to decide whether to process log records.

The server identifies transactions that are affected by the configuration change and the regions modified by those transactions 804. For affected regions where the server is backup, it sends a NEED-RECOVERY message to primaries of those regions 806.

For each affected region where the server is primary 808 the server prevents 810 reading or modifying of objects in the region until it is done recovering locks for that region. It waits for NEED-RECOVERY messages from backups of the region 812 and recovers transaction state 814 which tells it which objects need to be locked. The server locks 816 objects in the region which are affected by transactions.

The server then activates the region 818 so that reading or modifying of objects in the region can go ahead (except where those objects are locked).

The log recover process of FIG. 7, 702 comprises, for each affected region where the server is primary 820, replicating log records to backups if they do not already have them.

When all primary regions at the server are active, the server sends 822 a REGIONS-ACTIVE message to the configuration manager (CM). When the server receives an ALL-REGIONS-ACTIVE message 824 back from the CM it is triggered to carry out steps 826 and 828 which may occur in parallel. Step 826 comprises beginning allocator recovery. Step 828 comprises data recovery for new backups which involves replicating regions at new backups from their primary counterparts. Data recovery for new backups may proceed in parallel with foreground operation of transaction execution.

More detail about data recovery for new backups is now given:

A new backup for a region initially has a freshly allocated and zeroed local region replica. It divides the region across worker threads that recover it in parallel. Each thread issues one-sided operations to read a portion of data at a time from the primary. The portion size is large enough to use the network efficiently but small enough not to impact normal case operation. To reduce impact on foreground performance, recovery is paced by scheduling the next read to start at a random point within an interval after the start of the previous read. Each recovered object is examined before being copied to the backup. If the object was not locked at the primary and it has a version greater than the local version, the backup locks the local version with a compare-and-swap, updates the object state, and unlocks it. Otherwise, the object has been or is being updated by a transaction that created a version greater than or equal to the one recovered, and the recovered state is not applied.

Allocator recovery 826 is now described.

An allocator is a component on each machine. It tracks which memory areas within each region are in use (allocated) and which are free and can be returned by an object allocation request within a transaction. This state is recovered to avoid double-allocating the same memory and to avoid leaking a free object by incorrectly marking it allocated. The allocator is arranged to split the region into blocks that are used as SLABs for allocating small objects. It keeps two pieces of meta-data: block headers, which contain the object size, and SLAB free lists. Block headers are replicated to backups when a new block is allocated, meaning that they are available on the new primary after a failure. Block headers of regions being recovered are re-replicated from the new primary to backups immediately after receiving NEW-CONFIG-COMMIT, as they contain object size information used in data recovery. The primary sends block headers to all backups to avoid inconsistencies that could arise if the old primary failed while replicating the block header.

The SLAB free lists are kept only in the memory of the primary to reduce overheads of object allocation. Each object has a bit in its header that is set by an allocation and cleared by a free at transaction commit to enable recovering SLAB free lists. The lists are recovered by scanning the objects in the region, which is done in parallel by all threads on the machine. To minimize the impact on transaction lock recovery, allocation recovery starts after ALL-REGIONS-ACTIVE is received.

Figure 9:
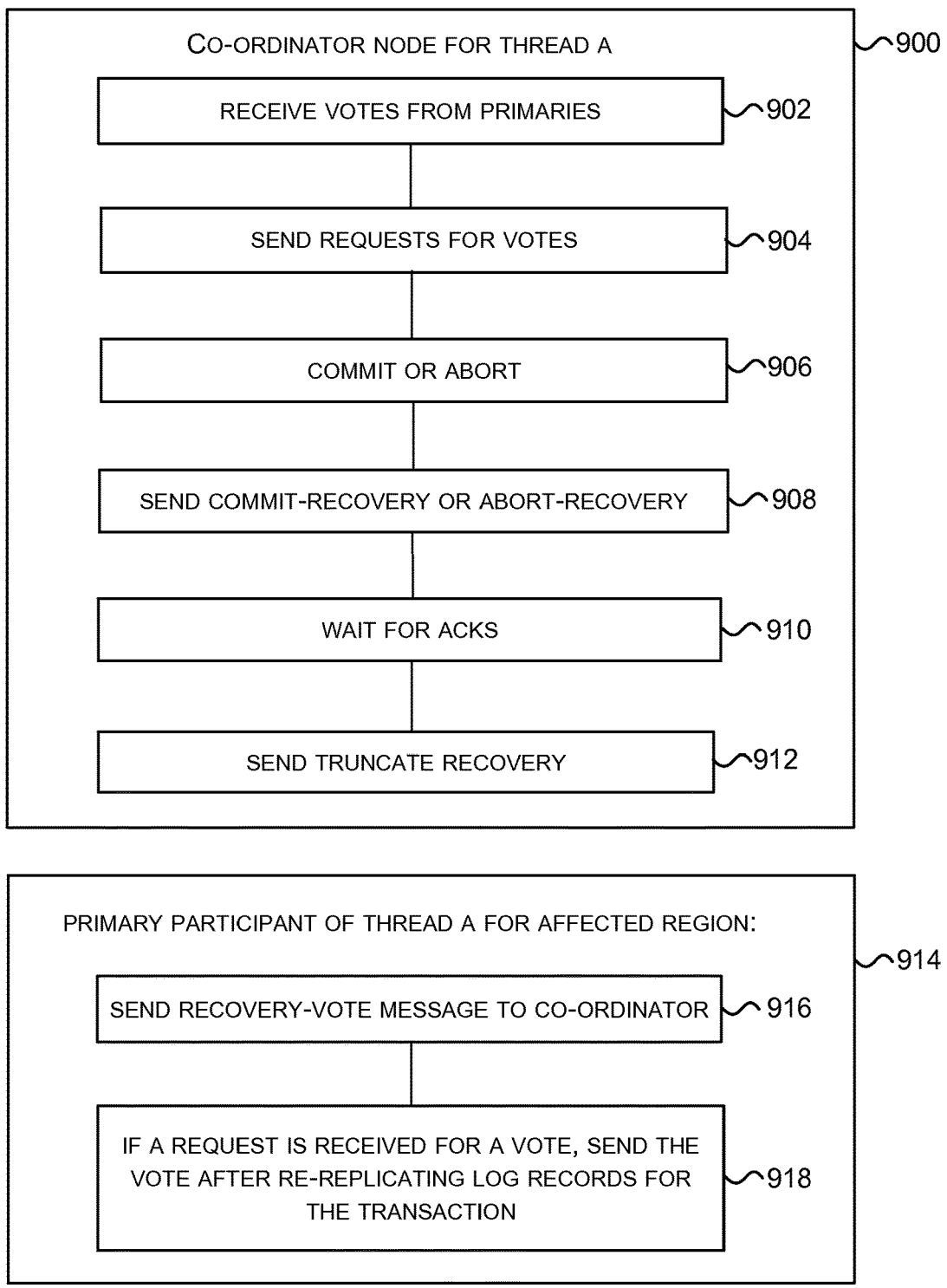
FIG. 9 is a flow diagram of a process at a server of a data center which is a coordinator of transaction A and of a process at a server of the data center which is a primary of a region participating in transaction A.

FIG. 9 is a flow diagram of a process at a server of a data center cluster which is a coordinator of transaction A and of a process at a server of the data center cluster which is a primary of a region participating in transaction A. These flow diagrams explain how coordinator state is recovered and how committing or aborting a transaction occurs as part of the recovery process.

Since the coordinator (i.e. the thread coordinating transaction A) is not replicated, the recovery process recovers the coordinator state for a transaction from the logs of the primaries of regions modified by the transaction. Consistent hashing is used to determine the coordinator for a transaction, making sure to that the coordinator remains the same if it is in the new configuration.

The server which is coordinator of transaction A receives votes 902 from primaries participating in the transaction A. It may also send requests 904 to those primaries for votes. The votes from the primaries are of different types according to log data at the primaries and/or types of messages received at the primaries.

Depending on the votes it receives the server decides whether to commit or abort the transaction 906. It informs the primaries of its decision by sending COMMIT-RECOVERY or ABORT-RECOVERY messages 908 to those primaries. It waits 910 for acknowledgements from the primaries and sends TRUNCATE-RECOVERY message to those primaries 912.

A primary which is participating in transaction A 914 carries out the method in the lower part of FIG. 9. For each region the primary has which is affected by the transaction, it sends a recovery vote message 916 to the coordinator. If a request is received for a vote, it sends the vote after re-replicating log records for the transaction 918.

More detail about the vote messages is now given. The threads in the primary send RECOVERY-VOTE messages to their peer threads in the coordinator for each recovering transaction that modified the region. The vote is commit-primary if any replica has a COMMIT-PRIMARY record in the log or received a COMMIT-RECOVERY message; abort if any replica has an ABORT record in the log or received an ABORT-RECOVERY message; commit-backup if any replica has a COMMIT-BACKUP record in the log and did not receive an ABORT-RECOVERY message; or lock if any replica has a LOCK record in the log and did not receive an ABORT-RECOVERY message. The vote message also includes the configuration identifier, the region identifier, the transaction identifier, and the list of region identifiers modified by the transaction.

The coordinator waits for RECOVERY-VOTE messages from each primary of a region modified by the transaction. Because some primaries may have never received a log record for the transaction or may already have truncated the log records for the transaction, the coordinator sends explicit requests to vote for a transaction to the primaries of the regions modified by a transaction if it does not receive the votes after a timeout. The REQUEST-VOTE messages include the configuration identifier, the region identifier, and the transaction identifier. If a machine that has the log records for a transaction receives this message, it sends the vote after re-replicating the log records. In this way the recovery process avoids distinguishing a machine that never received a log record for the transaction from a machine that already truncated the log records. In the first case the transaction should be aborted and in the second it may already have committed. To do this, each thread maintains a truncation data structure (referred to as truncated ids) to determine if a transaction has been truncated given its identifier. The transaction data structure may be kept compact by using a lower bound on non-truncated transaction identifiers, which is piggybacked on coordinator messages. If the transaction has been truncated, the thread replies with a vote of truncated. Otherwise, it replies with a vote of unknown.

More detail about the process of committing/aborting is now given.

Once the coordinator receives RECOVERY-VOTE messages from each primary of a region modified by the transaction it decides to commit if it received any commit-primary vote or if it received a commit-backup vote for one region and lock, commit-backup, or truncate votes for all the other regions. Otherwise it decides to abort. It then sends back COMMIT-RECOVERY or ABORT-RECOVERY to all participant replicas depending on the decision. Both messages include the configuration identifier and the transaction identifier. Threads that receive these messages treat COMMIT-RECOVERY similarly to a COMMIT-PRIMARY log record if they are the primary and similarly to a COMMIT-BACKUP log record if they are a backup. They treat receiving ABORT-RECOVERY as processing an ABORT record. The coordinator waits for acks from all participant replicas for the decision messages, and then sends a TRUNCATE-RECOVERY message to truncate the state for the transaction.

A primary commits and unlocks the objects modified by a transaction only after it processes a COMMIT-PRIMARY log record or receives a COMMIT-RECOVERY message. This ensures that transactions whose writes have been exposed to other transactions are guaranteed to eventually commit at all participants. When a transaction commits, all participant replicas have either LOCK, COMMIT-BACKUP, or COMMIT-PRIMARY log records or they have already truncated the transaction's records. Therefore, if the transaction is recovered the decision will be to commit. The same is true for transactions that the coordinator signaled committed to the client because this is done after receiving an ack from the NIC indicating that the COMMIT-PRIMARY record was written to the log, or an ack message that the COMMIT-RECOVERY message was received.

More detail about an example configuration manager 314 is now given.

The distributed memory is organized into regions of configurable size that are typically 2 GB. Regions are the unit of allocation and failure recovery for the cluster.

Allocation and mapping of regions to replicas is handled by a configuration manager (CM) running on one of the nodes. With 2 GB regions, we expect up to 250 regions on a typical server, hence a single CM can handle allocation for thousands of machines. This has several advantages over using consistent hashing. It lets us satisfy fault-tolerance constraints such as always placing replicas in different failure domains (e.g. racks). It makes it easier to balance load across servers and to operate close to capacity.

It is also easier to satisfy requests to allocate objects in the same locality group and to keep them in the same locality group when remapping regions after a failure. Finally, remapping on failure can be done such that data movement is minimized.

To allocate a new region, a node contacts the CM, which assigns a region identifier from a monotonically increasing counter and then selects replicas for the region attempting to balance the number of regions assigned to each machine subject to capacity and (any) locality group constraints. The CM uses a two phase commit protocol to allocate regions to ensure a mapping is replicated at all the replicas for the region before it is used. It starts by sending a prepare message to the selected replicas with the region identifier. If they all succeed in allocating the region, it sends a commit message for the region. Nodes fetch missing region mappings from the CM when needed. Threads cache the mappings, together with RDMA references needed to access the primary, and are thus able to read an object with a single one-sided RDMA read request in the common case.

The CM also handles failure detection via lease management and reconfiguration after a failure. Co-locating the CM on a node allows the CM to use RDMA-based protocols. The agreement service is used to store only the current configuration <I, S, CM> where i is a unique, monotonically increasing 64-bit configuration identifier, S is the set of nodes in the configuration, and CM is the configuration manager. The agreement node provides a service which is invoked only on a configuration change to update the membership of the configuration atomically.

More detail about an example lease scheme is now given.

Leases may be used to detect failures. Each non-CM node holds a lease at the CM and the CM holds a lease at every other node. Expiry of any lease triggers failure recovery. Leases are granted via a 3-way handshake. Each machine sends a lease request to the CM and it responds with a message that acts as both a lease grant and a lease request of its own.

Finally, machines reply with a lease grant. By default, lease renewal is attempted every ¼ of the lease expiry period as the leases are extremely short which is key to high availability. Under heavy load, the data center cluster can maintain sub-10 ms leases for a 60-machine cluster with no false positives. Significantly larger clusters may require a two-level hierarchy, which in the worst case would double failure detection time.

Achieving short leases under load required several optimizations. Lease messages use RDMA, but because RDMA queues are shared, they can be delayed due to lock contention and deep queuing behind other messages on the NIC. Dedicating queue pairs to lease management is suboptimal as it drastically increases the number of queue pairs at the CM, degrading NIC performance. Instead, the protocol sends lease messages using the connectionless unreliable datagram mode of RDMA, with receiver-side polling for low latency.

Lease renewal must also be scheduled on the CPU in a timely way. The recovery process uses a dedicated lease manager thread that may run at the highest user-space priority.

More detail about an example configuration change protocol is now given

When a machine is suspected of failing because of lease expiry, a reconfiguration is initiated by one of the machines which we will call CMnew, which may be the same as the current CM. CMnew first issues an RDMA read to all the machines in the system except the machine that is suspected.

These read probes (that were mentioned before) detect correlated failures that affect several machines, e.g., power and switch failures, which are all handled by a single reconfiguration. CMnew continues with the reconfiguration if it obtains responses for a majority of the probes. This ensures that if the network is partitioned, the CM will not be in the smaller partition.

After receiving replies to the read probes, CMnew attempts to update the configuration data stored in Agreement service (comprising nodes 106) from <I, S, CMold> to <i+1, S0, CMnew>, where S0 is the set of machines that replied to probes. The agreement service implements an atomic compare-and-swap that succeeds if the current configuration identifier is still i. For example, the agreement service may be implemented using znode sequence numbers to implement the atomic compare-and-swap. This ensures that only one node can become the CM for configuration i+1, as there might be multiple configuration change attempts in parallel.

A non-CM node initiates reconfiguration only if it suspects that the CM failed. It first asks one of a small number of "backup CMs" to make the change (the k successors of the CM using consistent hashing). If the configuration is unchanged after a timeout period then it attempts the reconfiguration itself. This design avoids a large number of simultaneous requests to the agreement node when the CM fails. The new CM then reassigns regions previously mapped to failed machines to restore the number of replicas to f+1 (to be able to tolerate f failures in each replica group). It tries to balance load and keep locality subject to space constraints. For failed primaries it always promotes a surviving backup to the new primary to reduce the time to recover. If it detects regions that lost all their replicas or there is no space to re-replicate regions, it signals an error. After remapping regions, the CM sends a NEW-CONFIG message to all the machines in the configuration with the configuration identifier, its own identifier, the identifiers of the other machines in the configuration, and all the new mappings of regions to machines. NEW-CONFIG also resets the lease protocol if the CM has changed: it grants a lease to all the nodes, which reply granting a lease to the new CM, and all nodes then discard leases from the previous configuration. If the CM is unchanged, lease exchange continues during reconfiguration. External client requests to the CM are blocked between suspecting a failure and NEW-CONFIG-COMMIT, and at other nodes between NEW-CONFIG and NEW-CONFIG-COMMIT.

Figure 10:
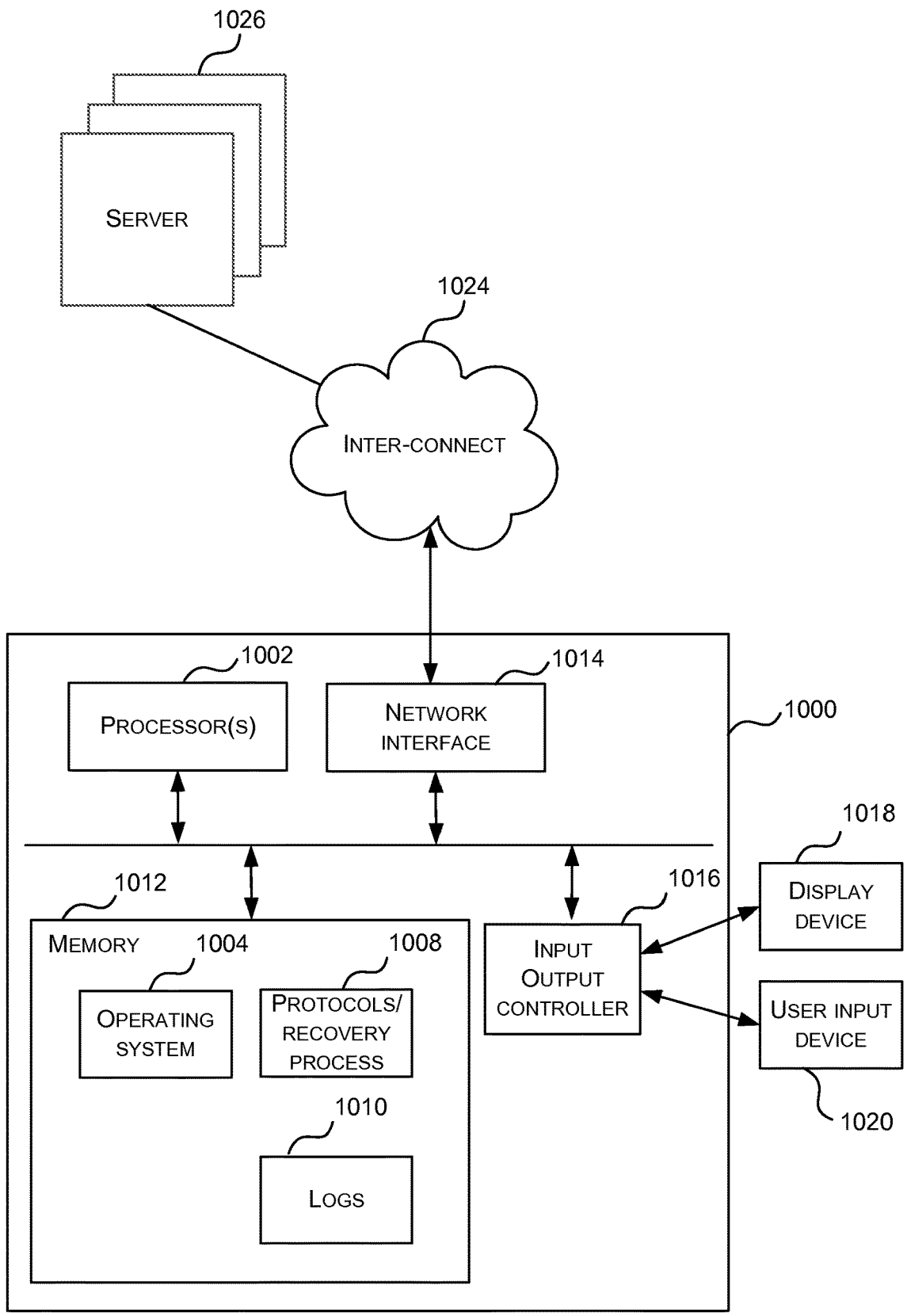
FIG. 10 is an exemplary computing-based device in which embodiments of a server of a data center may be implemented, such as the server of FIG. 2.

FIG. 10 illustrates various components of an exemplary computing-based device 1000 which may be implemented as any form of a computing and/or electronic device, and in which embodiments of a server of a data center cluster may be implemented. The server may be connected via an interconnect 1024 to a cluster of other servers 1026.

Computing-based device 1000 comprises one or more processors 1002 which may be microprocessors, controllers or any other suitable type of processors for processing computer executable instructions to control the operation of the device in order to recover from configuration changes in a cluster of servers at a data center such that transactions executing in the data center cluster retain ACID properties and may also retain serializability. In some examples, for example where a system on a chip architecture is used, the processors 1002 may include one or more fixed function blocks (also referred to as accelerators) which implement a part of the method of any of FIGS. 4 to 9 in hardware (rather than software or firmware). A part of the method of any of FIGS. 4 to 9 may also be implemented in hardware or software in the network interface 1014. Platform software comprising an operating system 1004 or any other suitable platform software may be provided at the computing-based device to enable protocols 1008 to be executed on the device such as recovery processes, configuration protocols and transaction protocols.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, DRAM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using network interface 1014). In some cases the computing based device 1000 comprises a battery and a solid state drive (SSD) and DRAM as described with reference to FIG. 2.

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to view transaction logs, control parameters of recovery processes or for other purposes. In an embodiment the display device 1018 may also act as the user input device 1020 if it is a touch sensitive display device. The input/output controller 1016 may also output data to devices other than the display device, e.g. a locally connected printing device.

In an example there is a server at a cluster of servers in a data center, the server comprising:

a memory being part of a distributed memory of the cluster;

at least one processor executing transactions and lock-free reads on software objects stored in regions of the distributed memory, the software objects and details of the transactions being replicated in the distributed memory, the processor arranged to receive a message indicating a new configuration of the cluster comprising addition, removal or potential failure of at least one of the other servers;

the processor configured to use a recovery process which enables the lock-free reads and committed ones of the transactions to retain the properties of atomicity, consistency, isolation and durability across configuration changes.

For example the processor is configured to use a recovery process which enables serializability of the committed transactions across configuration changes.

For example the processor is configured such that replies to one-sided read requests received at the server are refused at least on the basis of a configuration identifier sent with the read reply by a sending server.

For example the processor is arranged to receive the message comprising details of identities of all other servers in the new configuration and knowledge that all servers in the new configuration know the identities of all servers in the new configuration, such that one-sided operations on network interface cards of the servers may be performed whilst retaining the property of consistency of the lock-free reads and committed ones of the transactions.

In some examples the memory comprises non-volatile memory implemented using any of: dynamic random access memory together with a battery and a persistent store to which the contents of the DRAM are written using the battery power if the server crashes, non-volatile dual in-line memory modules, physical memory.

In an example the network interface card is configured to support leases with a timer, and to reject requests that arrive after a lease timer has expired without being renewed.

In an example there is a method performed at a server in a cluster of servers in a data center, the method comprising:

executing, at a processor, transactions and lock-free reads on software objects stored in regions of a distributed memory of the cluster of servers, the software objects and logs of the transactions being replicated in the distributed memory, receiving a message indicating a new configuration of the cluster comprising addition, removal or potential failure of at least one of the servers;

using a recovery process which enables the lock-free reads and committed ones of the transactions to retain the properties of atomicity, consistency, isolation and durability across configuration changes.

For example, the recovery process comprises a lock recovery process to recover write locks of transactions already being committed at the time of the new configuration, the lock recovery process operating to recover the write locks from the replicated transaction logs, which may have been written with one-sided writes.

For example, the recovery process comprises blocking transactions that are affected by the new configuration until the lock recovery process completes.

For example, the message indicating the new configuration is received from one of the servers in the cluster which is a configuration manager, the configuration manager having computed a set of the servers to be in the new configuration using at least one agreement node in communication with the cluster, the agreement node configured to decide which of the servers in the cluster is the configuration manager, the configuration manager having sent the computed set of the servers to the servers in the new configuration.

For example, the recovery process comprises a voting process whereby servers which participate in a transaction affected by the new configuration submit votes to a server acting as coordinator of the transaction, the votes being used to decide whether to commit or abort the transaction.

For example the votes are determined according to characteristics of logs at the servers and messages received at the servers.

For example the recovery process comprises a process for recovering data to be stored in regions which are new back up regions formed as a result of the new configuration, the process comprising one-sided reads from primary regions holding data to be replicated in the new back up regions.

For example the recovery process comprises an allocation recovery process, to recover the allocator's free lists used for allocating objects, which occurs after the lock recovery process.

For example the allocation recovery process comprises scanning object headers of objects stored in regions at a server.

In an example the recovery process is configured to enable transactions to resume reading objects and committing after the lock recovery process.

In an example the recovery process comprises reserving space for log records to ensure enough resources are available to commit transactions.

In an example the recovery process allows transactions that are not affected by the configuration change to read objects and commit concurrently with recovery process In an example the recovery process enables strict serializability of the committed transactions across configuration changes.

In an example a transaction has a unique identifier.

In an example a data center cluster comprises:

a plurality of servers connected via a network;

a distributed memory comprising local memory at individual ones of the servers;

the servers configured to execute transactions and lock-free reads on software objects stored in regions of the distributed memory, the software objects and details of the transactions being replicated in the distributed memory, the servers configured to use a recovery process which enables the lock-free reads and committed ones of the transactions to retain the properties of atomicity, consistency, isolation and durability across configuration changes comprising addition, removal or potential failure of at least one of the other servers.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A server at a cluster of servers in a data center, the server comprising:

a memory being part of a distributed memory of the cluster, the memory comprising a primary region storing a first data object that is a primary copy of the first data object and a back-up region storing a second data object that is a backup copy of the second data object, wherein a primary copy of the second data object is stored in a primary region of a second server in the cluster of servers in the data center;

at least one processor, configured to perform operations of:

executing transactions and lock-free reads on the first and second data objects stored in regions of the distributed memory, the first and second data objects and details of the transactions being replicated in the distributed memory;

locking the transactions;

receiving a message indicating a configuration change of the cluster, the configuration change comprising an addition, removal, or potential failure of at least one of the other servers in the cluster of servers; and responsive to receiving the message indicating the configuration change, performing a recovery process that is configured to:

execute at least one lock-free read of the lock-free reads to obtain a state of an object;

recover write locks of transactions already committed at a time of the configuration change, the lock recovery process configured to recover the write locks from replicated transaction logs;

perform a validation check by comparing the state of the object with a previously read state of the object; and in response to the validation check indicating a consistent state, unlock the transactions already committed.

2. The server of claim 1 wherein the recovery process retains a serializability of the committed transactions across the configuration change.

3. The server of claim 1 wherein the processor is configured such that replies to one-sided read requests received at the server are refused at least on the basis of a configuration identifier associated with the request.

4. The server of claim 1 wherein the processor is further configured to perform operations of:

receiving a message comprising details of identities of all other servers in a new configuration resulting from the configuration change and knowledge that all servers in the new configuration know the identities of all servers in the new configuration, such that one-sided operations on network interface cards of the servers may be performed whilst retaining the property of consistency of the lock-free reads and transactions that are committed.

5. The server of claim 1 wherein the memory comprises non-volatile memory implemented using any of: dynamic random access memory (DRAM) together with a battery and a persistent store to which contents of the DRAM are written using battery power if the server crashes, non-volatile dual in-line memory modules, physical memory.

6. The server of claim 1 having a network interface card configured to support leases with a timer, and to reject requests that arrive after a lease timer has expired without being renewed.

7. A method performed at a server in a cluster of servers in a data center, the method comprising:

storing a primary copy of a first data object in a primary region of a memory of the server, the memory being part of a distributed memory of the cluster;

storing a backup copy of a second data object in a backup-region of the memory, wherein a primary copy of the second data object is stored in a primary region of a memory of a second server in the cluster of servers in the data center;

executing, at a processor, transactions and lock-free reads on the first and second data objects stored in regions of a distributed memory of the cluster of servers, the first and second data objects and logs of the transactions being replicated in the distributed memory;

locking the transactions;

receiving a message indicating a configuration change of the cluster, the configuration change comprising an addition, removal, or potential failure of at least one of the servers in the cluster of servers; and responsive to receiving the message indicating the configuration change:

executing at least one lock-free read of the lock-free reads to obtain a state of an object;

recovering write locks of transactions already committed at a time of the configuration change, the lock recovery process configured to recover the write locks from replicated transaction logs;

performing a validation check by comparing the state of the object with a previously read state of the object; and in response to the validation check indicating a consistent state, unlocking the transactions already committed.

8. The method of claim 7 wherein the recovery process comprises blocking transactions that are affected by the configuration change until the lock recovery process completes.

9. The method of claim 7 wherein the message indicating the configuration change is received from one of the servers in the cluster which is a configuration manager, the configuration manager having computed a set of the servers to be in a new configuration using at least one agreement node in communication with the cluster, the agreement node configured to decide which of the servers in the cluster is the configuration manager, the configuration manager having sent the computed set of the servers to the servers in the new configuration.

10. The method of claim 7 wherein the recovery process comprises a voting process whereby servers which participate in a transaction affected by the configuration change submit votes to a server acting as coordinator of the transaction, the votes being used to decide whether to commit or abort the transaction.

11. The method of claim 10 wherein the votes are determined according to characteristics of logs at the servers and messages received at the servers.

12. The method of claim 7 wherein the recovery process comprises an allocation recovery process, to recover an allocator's free lists used for allocating objects, which occurs after a lock recovery process.

13. The method of claim 12 wherein the allocation recovery process comprises scanning object headers of objects stored in regions at a server.

14. The method of claim 7, wherein the recovery process is configured to enable transactions to resume reading objects and committing after the lock recovery process.

15. The method of claim 7 wherein the recovery process comprises reserving space for log records to ensure enough resources are available to commit transactions.

16. The method of claim 7 wherein the recovery process allows transactions that are not affected by the configuration change to read objects and commit concurrently with the recovery process.

17. The method of claim 7 wherein the recovery process enables strict serializability of the committed transactions across the configuration change.

18. A data center cluster comprising:

a plurality of servers connected via a network;

a distributed memory comprising local memory at individual ones of the servers, the distributed memory storing a plurality of data objects and comprising a primary region storing primary copies of respective ones of the data objects and a backup region storing secondary copies of respective different ones of the data objects; and the servers configured to execute transactions and lock-free reads on the plurality of data objects stored in regions of the distributed memory, the data objects and details of the transactions being replicated in the distributed memory;

the servers configured to lock the transactions;

the servers configured to execute a recovery process which is configured to:
execute at least one lock-free read of the lock-free reads to obtain a state of an object;
recover write locks of transactions already committed at a time of the configuration change, the lock recovery process configured to recover the write locks from replicated transaction logs;
perform a validation check by comparing the state of the object with a previously read state of the object; and
in response to the validation check indicating a consistent state, unlock the transactions already committed.

19. The server of claim 1, wherein the at least one lock-free read is executed using remote direct memory access (RDMA) by communicating with a network interface card (NIC) of a remote server storing the object without involving a processor of the remote server.

20. The server of claim 1, in response to the validation check indicating a state change, abort the transactions already committed.

* * * * *

UNITED STATES PATENT AND TRADEMARK OFFICE
CERTIFICATE OF CORRECTION

| | | |
|---|---|---|
| PATENT NO. | : 10,678,445 B2 | Page 1 of 1 |
| APPLICATION NO. | : 14/804000 | |
| DATED | : June 9, 2020 | |
| INVENTOR(S) | : Narayanan et al. | |

It is certified that error appears in the above-identified patent and that said Letters Patent is hereby corrected as shown below:

On the Title Page

On page 2, in Column 2, under "Other Publications", Line 24, delete "Specications:" and insert --Specifications:-- therefor On page 3, in Column 1, under "Other Publications", Line 13, delete "RAMCIoud"," and insert --RAMCloud",-- therefor In the Claims In Column 21, Line 37, in Claim 5, before "physical", insert --or--

Signed and Sealed this
Eighteenth Day of August, 2020

Andrei Iancu
*Director of the United States Patent and Trademark Office*